United States Patent Office 2,830,027
Patented Apr. 8, 1958

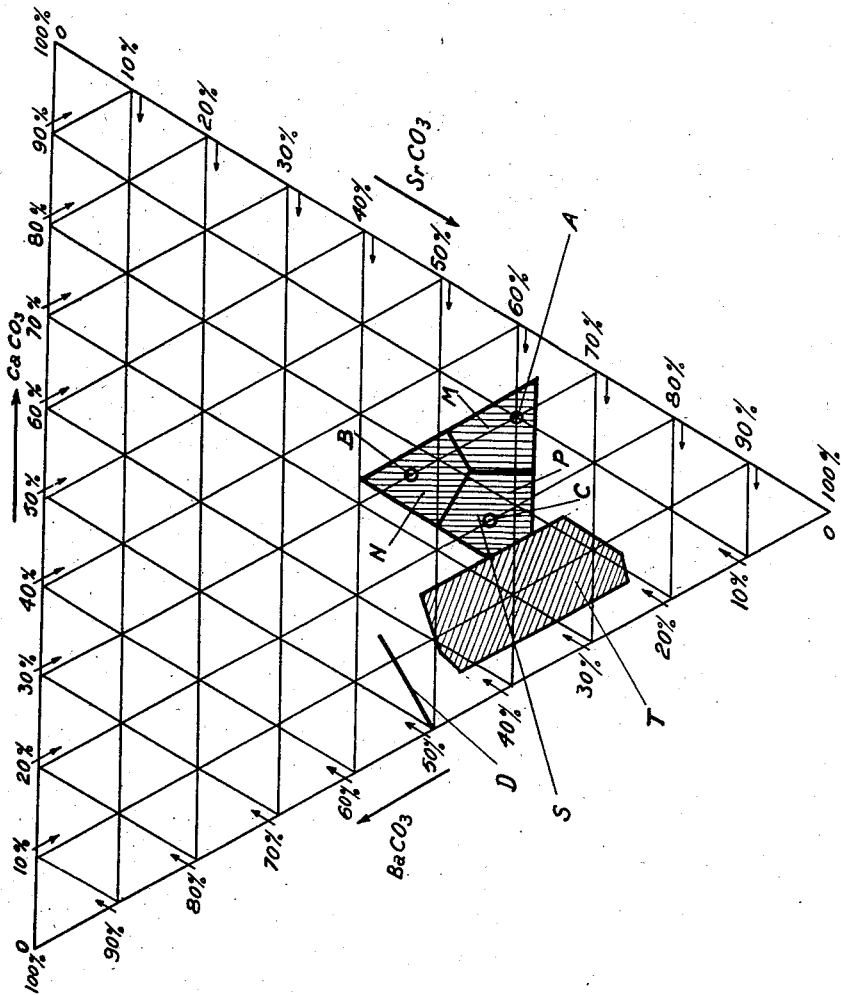

2,830,027

OXIDE-COATED CATHODES FOR THERMIONIC TUBES

Jean Schweitzer, Paris, France, assignor to Compagnie Generale de Telegraphie Sans Fil, a corporation of France Application November 21, 1955, Serial No. 548,155

Claims priority, application France November 22, 1954

2 Claims. (Cl. 252—521)

The present invention relates to oxide-coated cathodes for thermionic tubes, and more particularly to oxide coating materials for such cathodes.

These cathodes are generally manufactured by applying a coating of alkaline earth salts, for instance carbonates of barium, strontium and calcium (co-precipitated or mixed) on a nickel base. During the evacuation process of the tube, the carbonate coating is reduced to oxides. After a suitable thermal and electric treatment, well known in the art, such a cathode, when subjected to a temperature of 1100° C., is capable of having, under continuous operating conditions, an emission rate of the order of 150–200 ma./cm.$^2$, for a period substantially exceeding 100 hours.

One object of the invention is a new alkaline-earth carbonate coating compound having an improved emission rate and a low evaporation rate.

The invention will be better understood with the aid of the appended figure which represents a triangular diagram of a mixture of the carbonates of barium, calcium and strontium. This diagram is graduated along three triangular coordinates, respectively in proportion to the number of molecules of the carbonates of barium, calcium and strontium comprised in this mixture. In this diagram, points corresponding to known proportions lie within a hatched polygon T and on a straight line portion D, while points corresponding to compositions according to the invention lie within a hatched zone S.

It is known that the emission rate of a mixture of alkaline-earth oxides of barium, strontium and calcium is higher than that of these elements alone. Such mixtures have already been used in oxide-coated cathodes for vacuum tubes but with compositions systematically lying outside the hatched zone S. This zone S corresponds to the following molecular proportions:

$$3\% < BaCO_3 < 26\%$$
$$40\% < SrCO_3 < 63\%$$
$$15\% < CaCO_3 < 33\%$$

For instance, French Patent 1,029,729 describes carbonate compounds comprising, by weight, 25 to 50% of $BaCO_3$, 45 to 70% of $SrCO_3$ and 3 to 10% of $CaCO_3$. These proportions, by weight, converted into molecular proportions, lie within zone T of the diagram.

In practice, the compounds usually employed comprise a mixture of barium carbonate and strontium carbonate, in substantially equal molecular proportions and of less than 13% in molecules of calcium carbonate. These compounds substantially correspond to the straight line D of the diagram.

When cathodes coated with said compounds are used, for instance in multi-electrode tubes, the temperature to which the cathode is subjected, during the various treatments and during the operation of the tube, causes the barium, on account of its volatility, to evaporate from the cathode and condense on the grid or grids, thus increasing the rate of emission of said grids.

The present invention is based on applicant's investigations with established that cathodes, the composition of which corresponds to any point inside previously defined zone S, not only have emissive properties which can be compared to those of known compounds, but also give rise only to a slight condensation of emissive substances on other parts of the tube. Consequently, the tube provided with cathodes having a coating according to the invention have a very low thermal grid emission.

The composition according to the invention is constituted by a mixture of salts of barium, strontium and calcium containing Ba, Sr and Ca ions in the following proportions:

$$3\% < Ba < 26\%$$
$$40\% < Sr < 63\%$$
$$15\% < Ca < 33\%$$

According to a particular embodiment of the invention for obtaining compounds having a particularly low evaporation rate, the following proportions are employed:

$$3\% < Ba < 20\%$$
$$50\% < Sr < 63\%$$
$$24\% < Ca < 33\%$$

This range of compounds corresponds to zone M of the diagram. They are particularly adapted for cathodes of multi-electrode tubes. According to a modification the following proportions are used when a still better stability of cathode emission are required:

$$19\% < Ba < 26\%$$
$$40\% < Sr < 55\%$$
$$24\% < Ca < 33\%$$

This range of compounds corresponds to zone N of the diagram.

The following proportions are used for obtaining cathodes having good emission properties, over a comparatively wide range of temperatures:

$$3\% < Ba < 20\%$$
$$50\% < Sr < 63\%$$
$$15\% < Ca < 25\%$$

This range of compounds corresponds to zone P of the diagram.

The invention will be better understood with the aid of the following non-restrictive examples:

*Example 1*

There is prepared according to one known process used in the manufacture of oxide-coated cathodes, a mixture corresponding to a point A of zone M for which the molecular proportions of the three constituents are as follows:

| | Percent | |
|---|---|---|
| Barium carbonate | 10 | |
| Strontium carbonate | 60 | ± 3 |
| Calcium carbonate | 30 | |

This mixture is converted, during the manufacture of the cathode according to any known process, into a mixture of oxides constituting a coating composition presenting a rate of emission substantially equivalent to that of conventional compositions. A multi-electrode tube in which such coated cathode is used has a grid emission of the order of ten times lower than a tube having a cathode coated according to processes of the prior art: this has the important advantages of reducing wastage due to grid emission and of lowering the cost by doing away with expensive coatings such as platinum which, according to present known technique, must be applied to grids in order to reduce their emission.

*Example 2*

The process of manufacture is the same as in Example 1, the composition of the mixture, corresponding to point B of zone N of the diagram, being as follows:

| | Percent |
|---|---|
| Barium carbonate | 25 |
| Strontium carbonate | 45 |
| Calcium carbonate | 30 |

A cathode coated with such a compound, while permitting the tube in which it is incorporated to have a comparatively low grid emission, possesses improved emission stability and is particularly well adapted for tubes designed for long life, such as tubes used in telephone repeaters, etc.

*Example 3*

The process of manufacture is the same as in the preceding examples; the composition of the mixture, represented by point C taken in zone P of the diagram, is the following:

| | Percent |
|---|---|
| Barium carbonate | 25 |
| Strontium carbonate | 55 |
| Calcium carbonate | 20 |

A cathode coated with such a compound will be advantageously incorporated in tubes utilized in rockets, which require a high emission performance over a relatively wide temperature range, from 800 to 900° C., for instance.

It is to be understood that the invention is not restricted to the particular examples mentioned above. Any alkaline-earth compound which, during the manufacturing process of the tube or during its operation will lead to an oxide mixture corresponding to proportions of Ba, Sr and Ca ions lying inside the triangular diagram of the figure, is in the spirit and scope of the invention.

I claim:

1. A coating material for forming an oxide coating on a cathode, comprising a fired mixture of barium, strontium and calcium carbonates, in the following molecular proportions:

$$3\% < BaCO_3 < 20\%$$
$$50\% < SrCO_3 < 63\%$$
$$24\% < CaCO_3 < 33\%$$

the percentages of components adding up to 100%.

2. An electron emissive electrode covered with an oxide coating comprising a fired mixture of barium, strontium and calcium carbonates, in the following molecular proportions:

$$3\% < BaCO_3 < 20\%$$
$$50\% < SrCO_3 < 63\%$$
$$24\% < CaCO_3 < 33\%$$

the percentages of components adding up to 100%.

References Cited in the file of this patent

UNITED STATES PATENTS

| 2,547,869 | Kielholtz et al. | Apr. 3, 1951 |

FOREIGN PATENTS

| 1,029,729 | France | Mar. 11, 1953 |